Sept. 2, 1969  E. F' GEPPERT ET AL  3,464,231
CASCADED UNIVERSAL JOINT
Filed Oct. 5, 1967  3 Sheets-Sheet 1
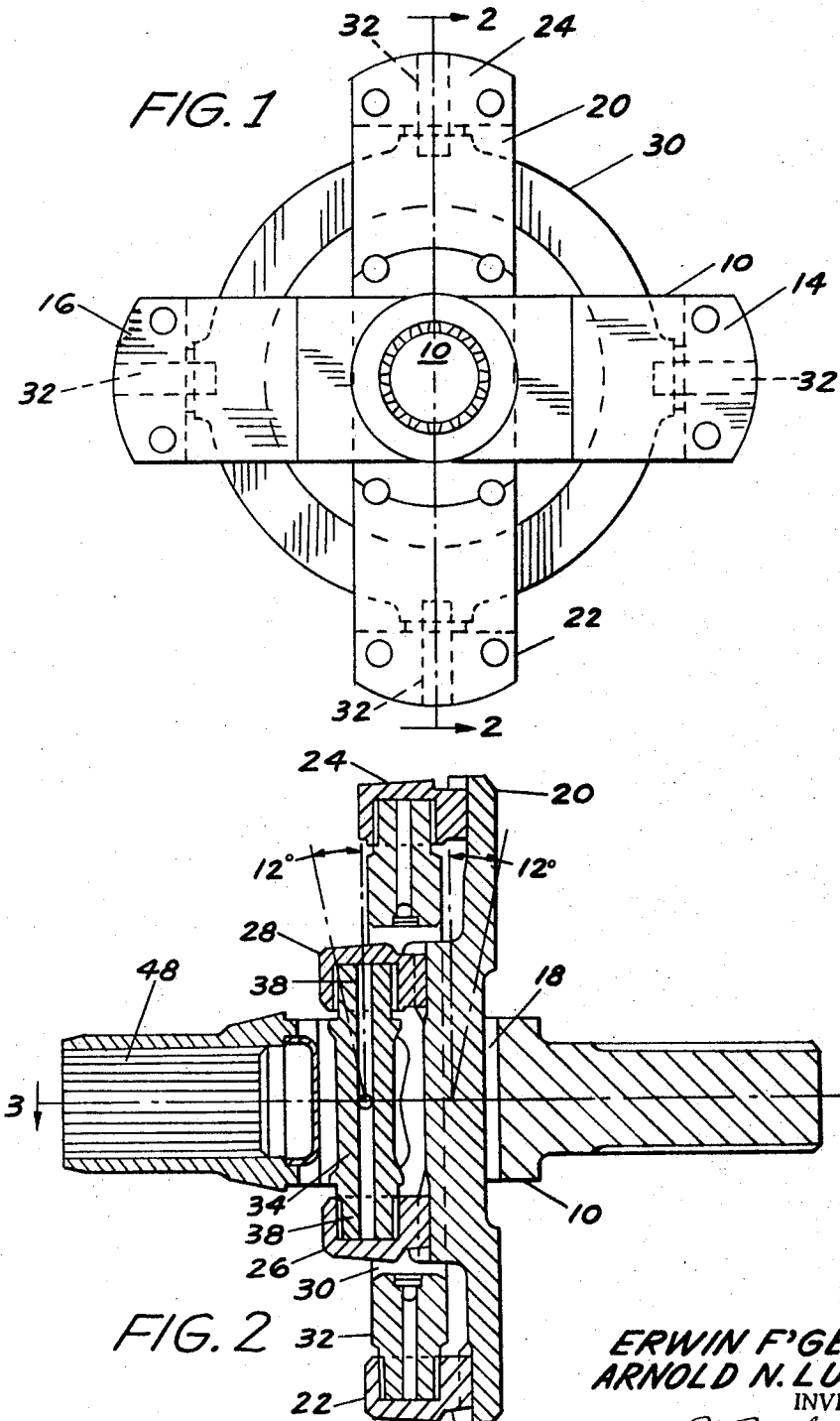
ERWIN F'GEPPERT
ARNOLD N. LUGOSKI
INVENTORS
BY H. M. Saragovitz
E. J. Kelly, H. Berl
and M. V. Wallace
ATTORNEYS

ERWIN F'GEPPERT
ARNOLD N. LUGOSKI
INVENTORS

ATTORNEYS

United States Patent Office 3,464,231
Patented Sept. 2, 1969

3,464,231
CASCADED UNIVERSAL JOINT
Erwin F'Geppert, Novi, and Arnold N. Lugoski, Detroit, Mich., assignors to the United States of America as represented by the Secretary of the Army
Filed Oct. 5, 1967, Ser. No. 673,225
Int. Cl. F16d 3/42
U.S. Cl. 64—18      4 Claims

ABSTRACT OF THE DISCLOSURE

Apparatus for allowing transmission of rotary motion from one mechanical unit to another even when the center lines of the two units are not in line, not at the same angle and/or not at the same level, said apparatus providing constant angular velocity, a minimum of length and a self-aligning bearing arrangement.

---

The invention described herein may be manufactured, used and licensed by or for the Government for governmental purposes without payment to us of any royalty thereon.

This invention relates to universal joints and more particularly to a new and improved cascade-type universal joint wherein said joint allows transmission of rotary motion from a mechanical unit, such as a transmission to another unit such as a gear box or the like, even though the center lines of the two units are not in line, not at the same angle and/or not at the same level.

The principal object of the present invention is to provide a new and improved cascaded universal joint which provides constant angular velocity, a minimum of length and a self-aligning bearing arrangement.

Another object of the invention is to provide a universal joint wherein a new and improved ball bearing is provided to compensate for deflection caused by torque transmittal which tends to cause the bearings to be at a slightly different angle from the spider and whereby what is termed "lock-up" is overcome.

A still further object of the invention is to provide a universal joint wherein the spiders are located around each other rather than lengthwise behind each other.

The above and other objects of the invention will appear more fully from the following more detailed description and from the drawings, wherein:

FIG. 1 is an end view of the device;

FIG. 2 is a longitudinal cross section taken substantially along line 2—2 of FIG. 1;

Figure 3:
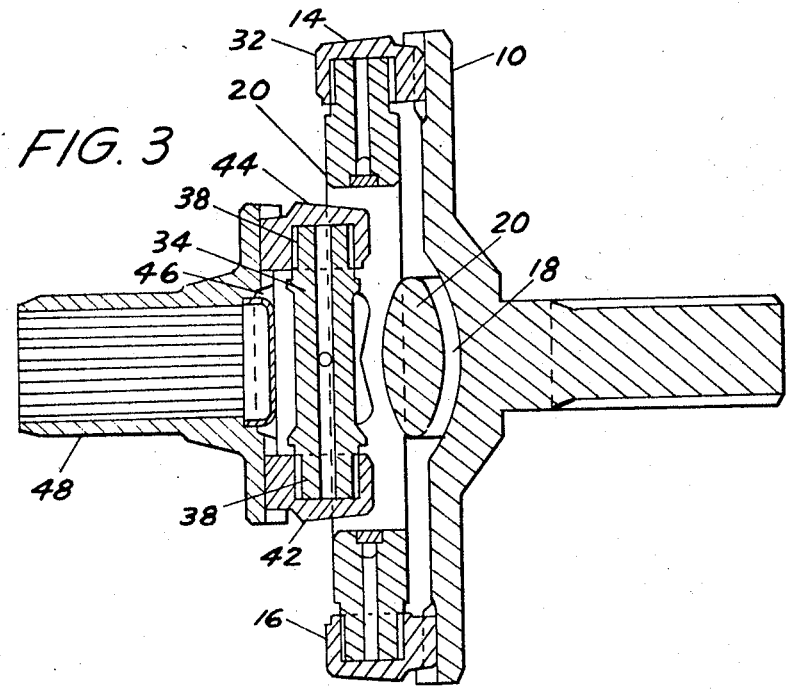
FIG. 3 is a longitudinal section taken substantially along line 3—3 of FIG. 2.

Referring now to the drawing in detail wherein like reference characters designate like and corresponding parts throughout the several views, it will be seen that the device comprises a built-up structure having an imput yoke 10 having mounted upon its opposed extremities bearing caps and bearings 14, 16. The imput yoke 10 has the central portion 18 thereof recessed to provide free movement of an intermediate yoke member 20 which has mounted on its extremities bearing caps and bearings 22, 24. Yoke 20 has also mounted within the confines of caps 22, 24, an additional pair of opposed caps and bearings 26, 28, caps 26, 28 being in an offset configuration with caps 22, 24. A ring type spider 30 is provided the same having formed thereon four spaced apart trunnion members 32, the same being pivotally mounted within bearing caps 14, 16, 22, 24, which in turn provide mounting means for spider 30 upon member 20 and also allows spider 30 to pivot upon opposed bearing caps 14, 16, mounted on yoke 10.

Also pivotally mounted within opposed bearings caps 26, 28, is a spider member 34 having opposed trunnions 38 formed thereon adapted to pivotally seat within opposed bearing caps 26, 28. Spider 34 also has thereon opposed trunnions 38 adapted to pivotally receive a yoke member 48, the same having formed thereon opposed bearing caps and bearings 42, 44, which in turn receive trunnions 38. The opposed sides of member 48 are cut away, as at 46, to form opposed arc-shaped openings to allow member 48 to clear bearing caps 26, 28, when yoke 48 is rocked from side to side. On yoke 48 is an output shaft. Numeral 50, FIG. 4, designates a ball-type bearing member disposed within bearing cap 52, the same being cored, as at 54, to receive a trunnion.

The manner in which the device operates is as follows:

The device provides a means that allows transmission of rotary motion from a mechanical unit such as a transmission to another unit such as a gear box even though the center lines of the two units are not in axial alignment, not at the same angle and/or at the same level. The device provides a constant angular velocity in the manner of a double spider joint, a minimum of length and a self-aligning bearing arrangement.

Most universal joints that perform similarly have a much greater length from end to end creating in turn a greater length of power plant in the installation in which it is used. With the advent of air-droppability and air-transportability total weight of installation becomes more and more important. The greater length of the universal joint causes automatically a greater weight of the installation by means of the structures required for locating the units connected by the universal joint. If it is desired to install the device to join, for example, a transmission and gear box, the imput yoke 10 is coupled to the drive shaft of the transmission, not shown, and the output yoke 48 is coupled to the gear train, not shown. As the imput yoke 10 is rotated its movement is imparted through yoke 10 to spider 30 which in turn is trunnioned in bearings in bearing caps 14, 16, which allow spider 30 to tilt. Inasmuch as spider 30 is also trunnioned in bearings in bearing caps 22, 24, located on yoke member 20 and member 20 has mounted thereon bearing caps 26, 28, which in turn pivotally receives the superimposed spider member 34 which supports output yoke 48 which in turn is coupled to the gear train, not shown, the gear train is caused to be moved by the transmission, not shown.

Figure 5:
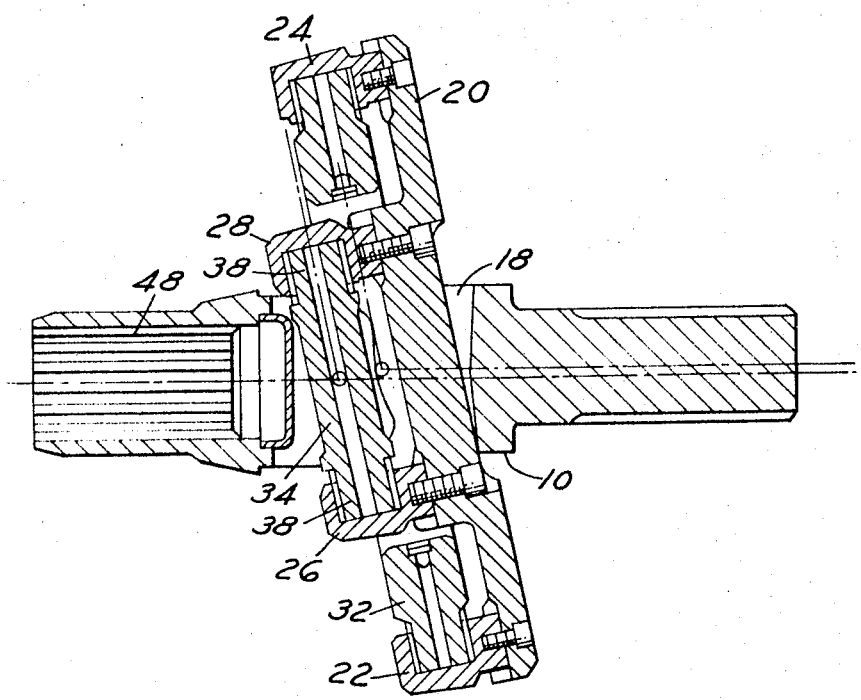
FIG. 5 is a cross-sectional view, similar to FIG. 2, showing the device when there is a parallel misalignment of the shafts.

When the cascade universal joint is installed in a condition where the axes of driving shaft 48 and the driven shaft 10 do not coincide, but are parallel to each other, the following will occur: The assembly, consisting of parts numbered 34, 38, 26, 28, 20, 24 and 22 (FIG. 5) and 30 (of FIG. 2), will pivot in bearing caps 44, 42, of driving shaft 48, while driven shaft 10 and bearing caps 14, 16, pivots a like but opposite amount about trunnions of ring spider 30. This can happen on account of the limits of the driving and driven units, not shown, and/or use of incorrect shims or spacers under one or the other unit.

Figure 4:
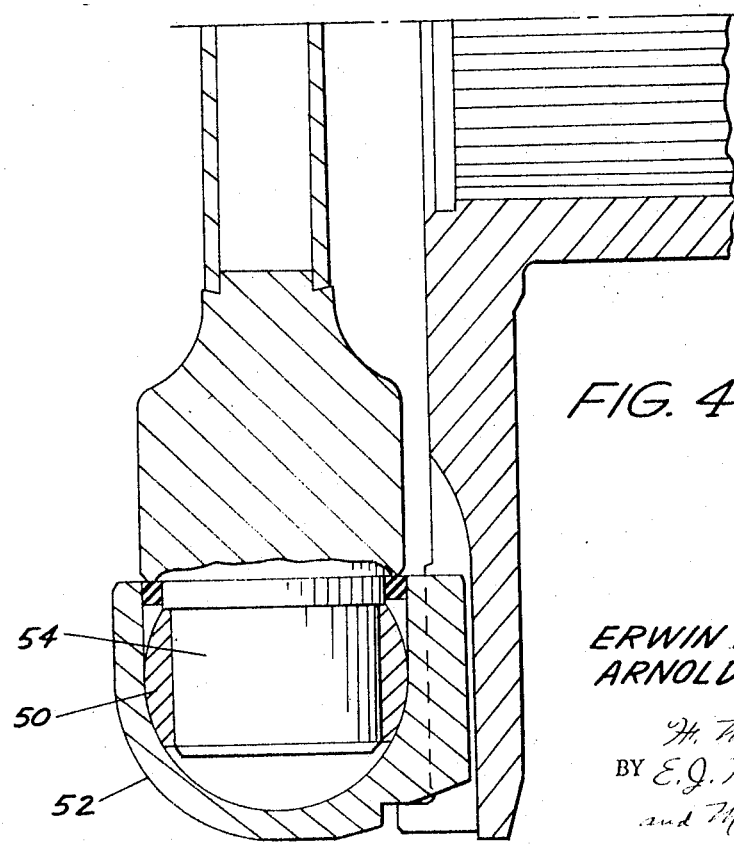
FIG. 4 is a cross-section through one of the trunnions showing the self-aligning bearing.

Ball-type bearings are shown in FIG. 4, wherein the bearing 50 in cap 52 is formed as a ball and has a bore 54 therethrough to receive a trunnion similar to those disclosed herein. With this type of bearing when any journal on a spider is deflected out of normal axial alignment with the center line of the bore of its bearing cap the ball will deflect with the journal.

The fact that the spiders are located around each other rather than lengthwise behind each other tends to shorten the device and cuts its weight. Also temporary overload, unusual deflection, a near miss of shellfire or an impact at collision could be overcome by this construction.

There has been disclosed herein a new and unique device allowing transmission of rotary motion from one mechanical unit to another even when the center lines of the two units are not in line, not at the same angle or not at the same level. This device also provides constant angular velocity, a minimum of length and a self-aligning bearing arrangement. The device also provides means for shortening the length of a vehicle, or the like, through its compact novel design.

It will be understood that the above description and accompanying drawings comprehend only the general and preferred embodiment of our invention and that various changes in construction, proportion and arrangement of parts may be made within the scope of the appended claims without sacrificing any of the advantages of our invention.

We claim:
1. In combination, a cascade universal joint for connecting two shafts comprising,
   an imput yoke member having opposed bearings mounted thereon,
   an intermediate ring spider pivotally mounted on said imput yoke member bearings,
   a second yoke member having bearings thereon pivotally engaging said ring spider,
   a second spider pivotally mounted on said second yoke, and an output yoke pivotally mounted on said second spider,
   thereby permitting said two shafts, which are normally coaxial and in parallel, to rotate freely in a parallel and non-coaxial or nonparallel configuration.

2. A universal joint as set forth in claim 1, wherein the second yoke is disposed between the spider ring and the first yoke.

3. A universal joint as set forth in claim 2, wherein the second spider is disposed internally of said spider.

4. A universal joint as set forth in claim 1, wherein said bearings comprise a cored ball.

References Cited
UNITED STATES PATENTS

| | | | |
|---|---|---|---|
| 1,180,468 | 4/1916 | Bartlett | 64—21 |
| 2,554,739 | 5/1951 | Hughes | 64—31 |
| 3,106,078 | 10/1963 | Turninsky | 64—31 |
| 3,306,077 | 2/1967 | Piatti | 64—21 |
| 3,385,081 | 5/1968 | Wier | 64—21 |

HALL C. COE, Primary Examiner

U.S. Cl. X.R.
64—21, 31